United States Patent
Kruse et al.

(10) Patent No.: US 9,236,811 B2
(45) Date of Patent: Jan. 12, 2016

(54) MULTIPHASE TRANSFORMER RECTIFIER UNIT

(75) Inventors: Lennart Kruse, Partille (SE); Johan Björk Svensson, Göteborg (SE); Ola Qvarnström, Göteborg (SE); Claes-Göran Sköld, Västra Frölunda (SE)

(73) Assignee: SAAB AB, Linköping (SE)

( * ) Notice: Subject to any disclaimer, the term of this patent is extended or adjusted under 35 U.S.C. 154(b) by 186 days.

(21) Appl. No.: 13/810,354

(22) PCT Filed: Jul. 15, 2010

(86) PCT No.: PCT/SE2010/050847
§ 371 (c)(1),
(2), (4) Date: Mar. 28, 2013

(87) PCT Pub. No.: WO2012/008889
PCT Pub. Date: Jan. 19, 2012

(65) Prior Publication Data
US 2013/0176756 A1 Jul. 11, 2013

(51) Int. Cl.
*H02M 7/06* (2006.01)
*H02M 7/04* (2006.01)
(Continued)

(52) U.S. Cl.
CPC .................. *H02M 7/04* (2013.01); *H01F 30/14* (2013.01); *H01F 2027/408* (2013.01)

(58) Field of Classification Search
CPC ......... H02M 7/068; H02M 7/08; H02M 7/06; H02M 7/066; H02M 7/162; H02M 7/1623; H02M 7/1626; H02M 1/14; H02M 1/15; H02M 1/4225; H02M 1/40; H02M 1/084; H02M 1/081; H02M 5/14; H02M 5/447; H02M 3/1584; H02M 3/285; H02M 7/04
USPC .................. 363/5, 45, 64, 129, 148, 152, 154
See application file for complete search history.

(56) References Cited

U.S. PATENT DOCUMENTS 5,107,410 A * 4/1992 Marsh et al. ...................... 363/2
5,337,227 A * 8/1994 Stacey et al. .................... 363/71
(Continued)

FOREIGN PATENT DOCUMENTS

CN 2658920 Y 11/2004
EP 0471183 A2 2/1992
(Continued)

OTHER PUBLICATIONS

PCT/ISA/210—International Search Report—Mar. 10, 2011 (Issued in PCT/SE2010/050847).
(Continued)

*Primary Examiner* — Gary L Laxton
*Assistant Examiner* — Kevin H Sprenger
(74) *Attorney, Agent, or Firm* — Venable LLP; Eric J. Franklin

(57) ABSTRACT

A multiphase transformer rectifier unit for converting a three-phase alternating current supplied from a power distribution system to direct current supplied to at least one load. The multiphase transformer rectifier unit includes a magnetic core having a primary winding set and secondary winding set, and a rectifier circuit. The secondary winding set is arranged to generate N substantially equally distributed output phases, wherein N is an odd number multiple of 3, and N>3, and the primary winding set (17) is arranged to provide a positive or negative phase shift equal substantially to $$\frac{360}{(8 \times N)}$$

degrees of said output phases. Also an arrangement of two inventive multiphase transformer rectifier units for reducing current distortion in the power distribution system.

9 Claims, 5 Drawing Sheets

(51) Int. Cl.
*H01F 30/14* (2006.01)
*H01F 27/40* (2006.01)

(56) References Cited

U.S. PATENT DOCUMENTS

| | | | |
|---|---|---|---|
| 6,198,647 B1* | 3/2001 | Zhou et al. | 363/154 |
| 6,424,552 B1* | 7/2002 | Jacobson | 363/154 |
| 6,930,578 B2 | 8/2005 | Thibault et al. | |
| 7,233,506 B1 | 6/2007 | Paice | |
| 7,277,302 B2* | 10/2007 | Gazel et al. | 363/5 |
| 7,719,858 B1* | 5/2010 | Paice | 363/5 |
| 2008/0130320 A1 | 6/2008 | Bruzy et al. | |
| 2010/0176755 A1* | 7/2010 | Hoadley et al. | 318/105 |
| 2013/0083575 A1* | 4/2013 | Kippley et al. | 363/64 |
| 2014/0016356 A1* | 1/2014 | Furmanczyk et al. | 363/3 |

FOREIGN PATENT DOCUMENTS

| | | |
|---|---|---|
| EP | 0471183 B1 | 2/1992 |
| WO | WO-2009/124319 A2 | 10/2009 |

OTHER PUBLICATIONS

PCT/ISA/237—Written Opinion of the International Searching Authority—Mar. 10, 2011 (Issued in PCT/SE2010/050847).

State Intellectual Property Office of People's Republic of China (With Translation)—Notification of the First Office Action—Apr. 15, 2015 (Issued in Counterpart Application No. 201080068008.1).

\* cited by examiner

MULTIPHASE TRANSFORMER RECTIFIER UNIT

CROSS-REFERENCE TO RELATED APPLICATIONS

The application is the national phase under 35 U.S.C. §371 of PCT/SE2010/050847 filed 15 Jul. 2010.

TECHNICAL FIELD

The present invention relates to a multiphase transformer rectifier unit for converting a three-phase alternating current supplied from a power distribution system to direct current supplied to at least one load, and a method of connecting the same with another multiphase transformer rectifier unit for reducing current distortion in the power distribution system.

BACKGROUND ART

When supplying electrical power to a DC load from a three-phase AC power distribution system a conventional six-pulse rectification of the AC will often result in unacceptable current distortion on the power distribution system and a low power factor.

Multiphase transformer rectifier unit is a known technology to achieve near unity power factor and low current distortion when connecting DC loads to AC networks. Conventional multiphase transformer rectifier units comprises a magnetic core with a primary winding set and secondary winding set, a rectifier circuit, and three input terminals for connecting said primary winding set to a three-phase AC power distribution system. The secondary winding set is further arranged to generate multiple three-phase systems at its output, which multiple three-phase systems are phases shifted with respect to each other to provide an increased number of output phases.

With increasingly smaller phase shift between each output phase, i.e. the more AC phases that are rectified, the current distortion decreases correspondingly. Hence, to further reduce current distortion of the power distribution system, more windings have to be added to the secondary winding set to provide more output phases. This will however result in higher conduction losses and increased weight of the unit as the secondary winding set becomes increasingly complex.

Document U.S. Pat. No. 6,930,578 B2 discloses an arrangement comprising two multiphase transformers that are configured to reduce harmonic currents in the power distribution network by a load specific installation of the multiphase transformers. The document discloses first and second multiphase transformer connected to a three-phase AC power source, wherein each of said multiphase transformers feeds an individual AC load. Each transformer comprises a primary having a plurality of sets of contact points for receiving power from a three-phase AC power source, and a secondary electromagnetically coupled to the primary having a single set of contact points for connection to a plurality of loads. Each set of contact points of the primary provides a respective primary-to-secondary phase shift, whereby contacts points of the primary of the first and second transformer are selected after installation of the transformers, such that a harmonic of a current from the primary of the first transformer and a harmonic of a current from the primary of the second transformer substantially cancel. The disadvantages of the arrangement described in U.S. Pat. No. 6,930,578 B2 are that the selection of appropriate contact points of the primary of each of the two transformers is a very complex task that requires suitable measurement equipment. Moreover, transformer cost increases when additional contacts points must be provided to the multiphase transformer.

There is thus a need for an improved multiphase transformer rectifier unit design that provides reduced current distortion on the power distribution system and an increased power factor.

SUMMARY

The object of the present invention is to provide an inventive multiphase transformer rectifier unit for converting a three-phase AC to DC, and a method of connecting the same with another multiphase transformer rectifier unit for reducing current distortion of the power distribution system, where the previously mentioned problems can be partly avoided. This object is achieved by a suitable arrangement of at least two multiphase transformer rectifier units. The multiphase transformer rectifier unit according to the invention comprises a secondary winding set that is arranged to generate N substantially equally distributed output phases, wherein N is an odd number multiple of 3, and N>3. The inventive multiphase transformer rectifier unit further comprises a primary winding set that is arranged to provide said output phases with a positive or negative phase shift equal substantially to degrees.

$$\frac{360}{(8 \times N)}$$

Said object is further achieved by the method according to the invention, which includes the steps of generating N substantially equally distributed output phases by means of said secondary winding set, wherein N is an odd number multiple of 3, and N>3, and providing said output phases with a positive or negative phase shift equal substantially to $$\frac{360}{(8 \times N)}$$

degrees of by means of said primary winding set. The inventive method further comprises the steps of connecting a first input terminal of said first and second multiphase transformer to a first phase of the power distribution system, connecting a second input terminal of said first multiphase transformer to a second phase of the power distribution system, connecting a third input terminal of said first multiphase transformer to a third phase of the power distribution system, connecting a second input terminal of said second multiphase transformer to the third phase of the power distribution system, and connecting a third input terminal of said second multiphase transformer to the second phase of the power distribution system.

The number of output phases from an arrangement comprising two multiphase transformer rectifier unit, each having N output phases, will thus appear as 2*N to the power distribution system when the pulses from said two multiphase transformer rectifier units are interleaved. The solution has thus the performance of a multiphase transformer rectifier unit having 2*N output phases, but a complexity close to a multiphase transformer rectifier unit having N pulses. Compared to using a single 2*N output phase multiphase transformer rectifier unit the inventive solution also provides the opportunity to supply two separate isolated loads.

Further advantages are achieved by implementing one or several of the features of the dependent claims

BRIEF DESCRIPTION OF THE DRAWINGS

The present invention will now be described in detail with reference to the figures, wherein.

DETAILED DESCRIPTION

In the following, the term "winding" refers to a single continuous coil of wire on a single core leg of a three legged core transformer. The term "primary winding set" refers to a set of windings that constitute all the windings connected to a power supply network, whereas a "secondary winding set" refers to set of windings that constitute all the windings connected to rectifiers on the load side of the transformer. A "phase set" will refer to two or more windings that are found on a common core leg of the transformer, wherein a "primary phase set" refers to two or more windings that are found on a common core leg and adapted for being connected to the power distribution system, whereas a "secondary phase set" refers to two or more windings that are found on a common core leg and adapted for being connected to at least one load.

Figure 1:
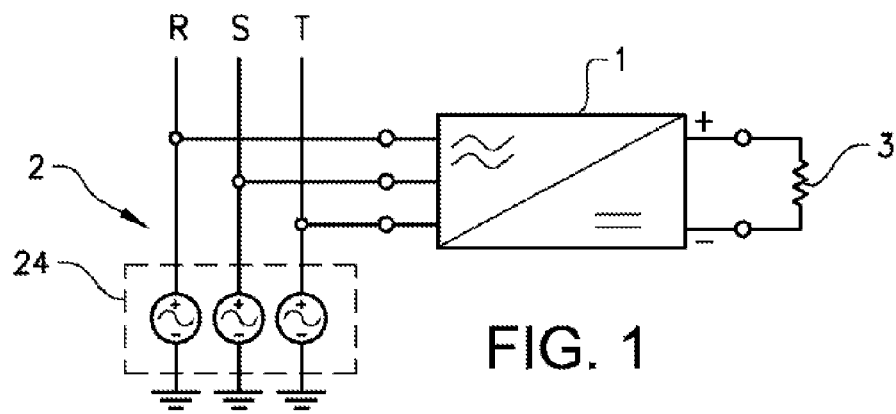
FIG. 1 shows a multiphase transformer rectifier unit connected to a three-phase AC power distribution system and a DC-load.

FIG. 1 shows a multiphase transformer rectifier unit 1 for converting a three-phase (R, S, T) alternating current (AC) supplied from a power distribution system 2 to direct current (DC) supplied to a single load 3.

Figure 2:
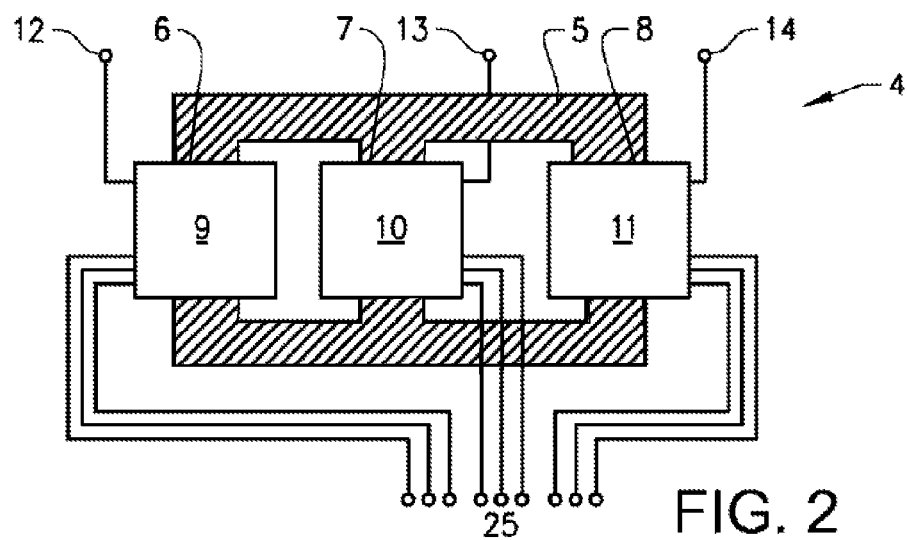
FIG. 2 shows schematically a power converter of the multiphase transformer rectifier unit of FIG. 1.

As shown in FIG. 2, the multiphase transformer rectifier unit 1 comprises a power converter 4 having a magnetic core 5 with a first leg 6, second leg 7 and third leg 8. A first coil 9, second coil 10, and third coil 1 is wound around said first, second and third leg 6, 7, 8 respectively. A primary winding set of the multiphase transformer rectifier unit 1 is connected to the supply phases R, S, T of a three-phase AC power distribution system 2 by means of a first input terminal 12, second input terminal 13, and third input terminal 14. The primary winding set is disposed in inductive relation with said magnetic core 5 for establishing a magnetic flux therein. The secondary winding set is arranged to provide multiple output three-phase systems by suitable winding configuration of the secondary winding set, which multiple output three-phase systems are phase shifted with respect to each other to provide evenly distributed output phases. The secondary winding set is disposed in inductive relation with said magnetic core 5, and the output phases of the secondary winding set are provided at a set of output terminals 25.

The number of output three-phase systems can be selected to be appropriate for the specific application. For example, a secondary winding set can be arranged to generate three output three-phase systems, adding up to a total of nine output phases. The output phases of a first output three-phase system are for example in phase with the supply phases R, S, T of the power distribution system, the output phases of a second output three-phase system are leading the supply phases R, S, T with 40°, and the output phases of a third output three-phase system are lagging the supply phases with 40°. This will result in nine output phases equally distributed. Rectification of said nine output phases by means of for example a polyphase full-wave bridge rectifier circuit, which generates two pulses per period for each phase, would provide an 18-pulse multiphase transformer rectifier unit. The primary and secondary winding sets can be configured to step-up or step-down the input voltage level to achieve higher or lower output voltage level.

As described in the introduction, the main advantages of generating additional AC output phases by means of a multiphase transformer rectifier unit 1 are that less current distortions inflicted by rectification of the output phases and/or loads are induced in the power distribution system 2, and a DC output voltage with less voltage ripple is provided. Increased number of windings in the secondary winding set will however lead to higher conduction losses, increased weight and higher manufacturing cost of the multiphase transformer rectifier unit 1 as the secondary winding set becomes increasingly complex.

Figure 3:
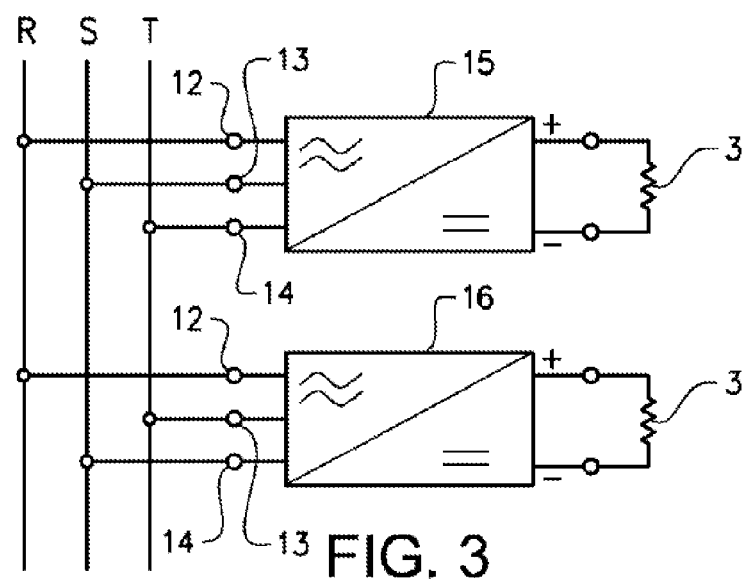
FIG. 3 shows a power distribution arrangement comprising two multiphase transformer rectifier units according to the invention.

This problem is solved by providing the multiphase transformer rectifier unit 1 according to the invention with a phase shift in the primary winding set in addition to multiple output phases on the secondary winding set, and connecting two of said multiphase transformer rectifier units 1 to the same power distribution system 2 but changing the order of connection of one of the two multiphase transformer rectifier units 1 with respect to the other multiphase transformer rectifier unit 1. Such an inventive power distribution arrangement is shown in FIG. 3, having a first multiphase transformer rectifier unit 15 and a second multiphase transformer rectifier unit 16. By introducing a phase shift also in the primary winding set, the current distortion of the power distribution system 2 inflicted by the combined first and a second identical multiphase transformer rectifier units 15, 16 will be reduced, provided that the order in which input phases R, S, T of the power distribution system 2 are connected to a first of said multiphase transformer rectifier units 15, 16 are changed with respect the second of said multiphase transformer rectifier units 15, 16. The phase shift generated by the primary winding set is a primary-to-secondary phase shift that shifts the entire set of output phases a predetermined degree forward or backward.

The change of order of connection of the input phases R, S, T in combination with a phase shift generated by the primary winding set of each of said first and second identical multiphase transformer rectifier units 15, 16 results in a positive phase shift of the entire set of output phases of one of said first and second multiphase transformer rectifier units 15, 16, and a negative phase shift of the entire set of output phases of the other of said first and second multiphase transformer rectifier units 15, 16. By appropriate selection of the phase shift in the primary winding set and the number of output phases of each of said first and second multiphase transformer rectifier unit 15, 16, the pulses from said first and second multiphase transformer rectifier units 15, 16 will be interleaved, i.e. the pulses from the first multiphase transformer rectifier unit 15 will be arranged substantially in the centre between the pulses from the second multiphase transformer rectifier unit 16 in alternating and regular manner seen in a phase diagram. Such an arrangement of two identical multiphase transformer rectifier units 15, 16 results in a degree of current distortion of the power distribution system 2 similar to a single multiphase transformer rectifier unit having twice as many output phases as provided by each of said first and second multiphase transformer rectifier units 15, 16 separately.

According to one example of how said first and second multiphase transformer rectifier units 15, 16 can be connected to the power distribution system 2, the first input terminals 12 of the first and second multiphase transformer rectifier unit 15, 16 are connected to a first phase R of the 3-phase power distribution system 2. The second input terminal 13 of the first multiphase transformer 15 is connected to a second phase S of the power distribution system 2, and the third input terminal 14 of the first multiphase transformer 15 is connected to a third phase T of the power distribution system. The second input terminal 13 of the second multiphase transformer 16 is connected to the third phase T of the power distribution system, and the third input terminal 14 of the second multiphase transformer 16 is connected to the second phase S of the power distribution system, such that a first plurality of output phases of the first multiphase transformer rectifier unit 15 are phase shifted with respect to a second plurality of output phases of the second multiphase transformer rectifier unit 16.

This will lead to reduced current distortion in the power distribution system 2 inflicted mainly be said first and second multiphase transformer rectifier units 15, 16 and/or loads 3. In the specific example of changed order of connection presented above, the order of connection of input phases S and T where changed. As apparent to the skilled person, the input phases R and S or R and T could alternatively have been changed with the same result in phase shift.

The inventive selection of the phase shift in the primary winding set and number of output phases of each multiphase transformer rectifier unit 15, 16 that provides the effect of doubled output pulses by parallel arrangement of said first and second multiphase transformer rectifier units 15, 16 can be defined in general terms. A multiphase transformer rectifier unit 1 having a secondary winding set provided with N substantially equally distributed output phases, wherein N is an odd number multiple of 3, and N>3, should have a primary winding set that provides a phase shift equal substantially to $$\frac{360}{(8 \times N)}$$

degrees. For example, a secondary winding set generating nine output phases (N=9) should according to the invention have a primary winding set providing a phase shift of 360/(8×9), thus equal to 5°. Nine output phases results in 360/9=40° between each output phase, and consequently 20° between each pulse. A first multiphase transformer rectifier unit 15 having for example a negative primary phase shift of 5° arranged in parallel with a second multiphase transformer rectifier unit 16 having a positive primary phase shift of 5° thus results in 10° between each pulse of the combined arrangement, wherein said first and second multiphase transformer rectifier units 15, 16 will supply said pulses to their loads in an alternating manner. This relation between number of output phases and phase shift on the primary winding set assures that an arrangement of two of said multiphase transformer rectifier units 1, connected to the power distribution system 2 with changed order of the input phases as described previously, will have substantially interleaved pulses. The number of output phases of each secondary winding set can according to the invention, for example, be any of 9, 15, 21, 27, 33, or 39, etc.

The phase shift of the primary winding set might not be exactly $$\frac{360}{(8 \times N)}$$

degrees because the factual primary phase shift depends on the windings composing the primary winding set. Sometimes, it is not possible to achieve exactly the desired primary phase shift due to lack of resolution, i.e. lack of sufficient turns on the legs 5, 6, 7 of the magnetic core 5. Correspondingly, in certain circumstances, the output phases of the secondary winding set might be slightly offset from equally distributed over the 360° spectrum for the same reason.

The inventive multiphase transformer rectifier unit 1, when arranged in parallel with an additional identical multiphase transformer rectifier unit 1, and each multiphase transformer rectifier unit 1 being connected differently to the three-phase AC power distribution system 2 such that one of the multiphase transformer rectifier units 1 has negative primary phase shift and the other multiphase transformer rectifier unit 1 has positive primary phase shift, results in reduced weight, cost, and conduction losses, compared with a single multiphase transformer rectifier unit 1 inflicting a similar amount of current distortion to the power distribution system 2 because only half as many output phases are required.

Compared with a single multiphase transformer rectifier unit 1 having same number of output phase but without the primary phase shift, the inventive multiphase transformer rectifier unit 1, when arranged in parallel with an additional identical multiphase transformer rectifier unit 1 as described above, leads to reduction in total harmonic distortion (THD) of the power distribution system current and a nearly unity power factor.

The phase shift of the primary winding set can be arranged in an extended-delta configuration, a zig-zag configuration, or a polygon configuration dependent on requirements.

In the following one detailed embodiment of the multiphase transformer rectifier unit 1 according to the invention is shown and described, simply by way of illustration of one mode of carrying out the invention.

Figure 4:
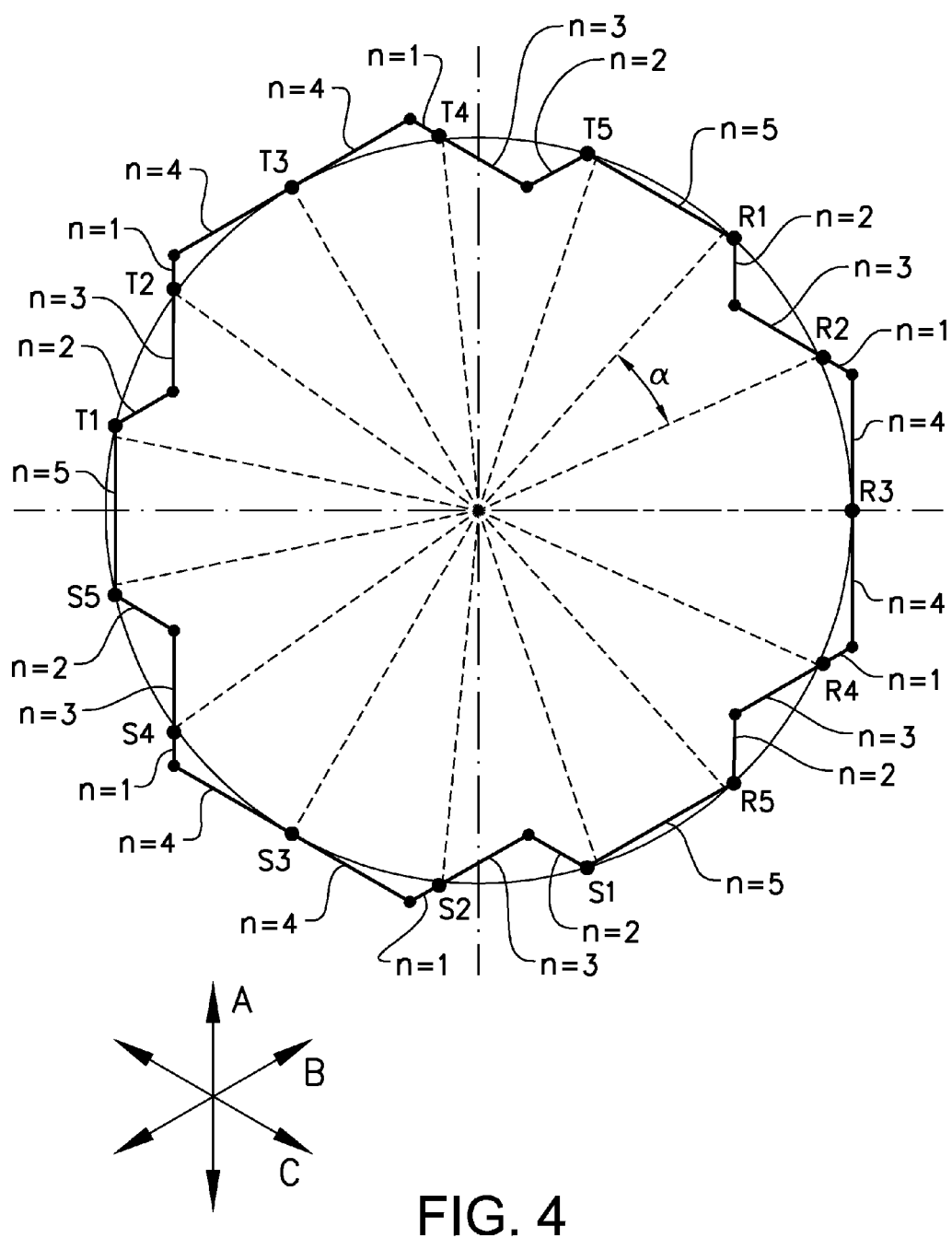
FIG. 4 shows a phase diagram of the secondary winding set according to the invention.
Figure 5:
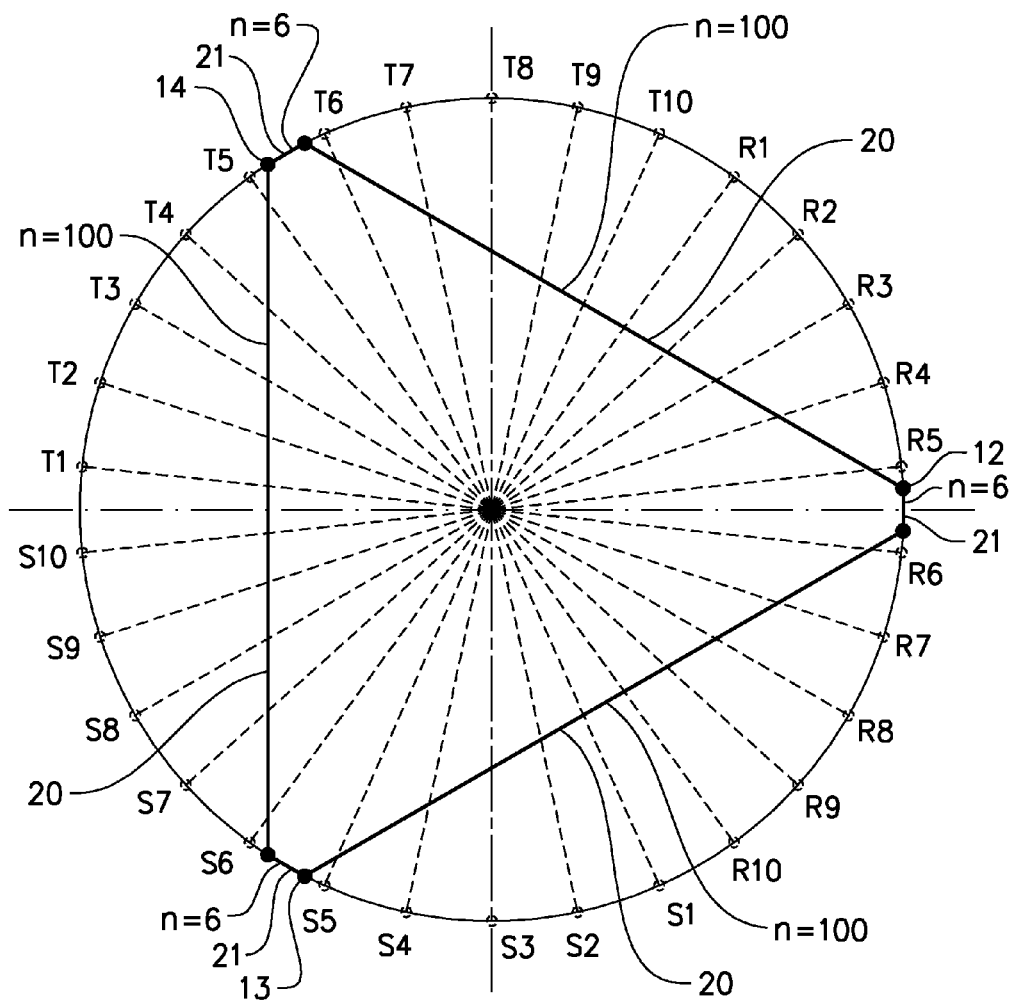
FIG. 5 shows a phase shift of the primary winding set according to the invention.

FIG. 4 shows a phase diagram of the secondary winding set of an isolated multiphase transformer rectifier unit 1 according the invention having three input phases R, S, T and 15 output phases R1, S1, T1, R2, S2, T2, R3, S3, T3, R4, S4, T4, R5, S5, T5. FIG. 5 shows the phase shift of the primary winding set of said multiphase transformer rectifier unit 1 according the invention, and FIG. 6 shows the corresponding connection diagram of the primary and secondary winding sets.

Figure 6:
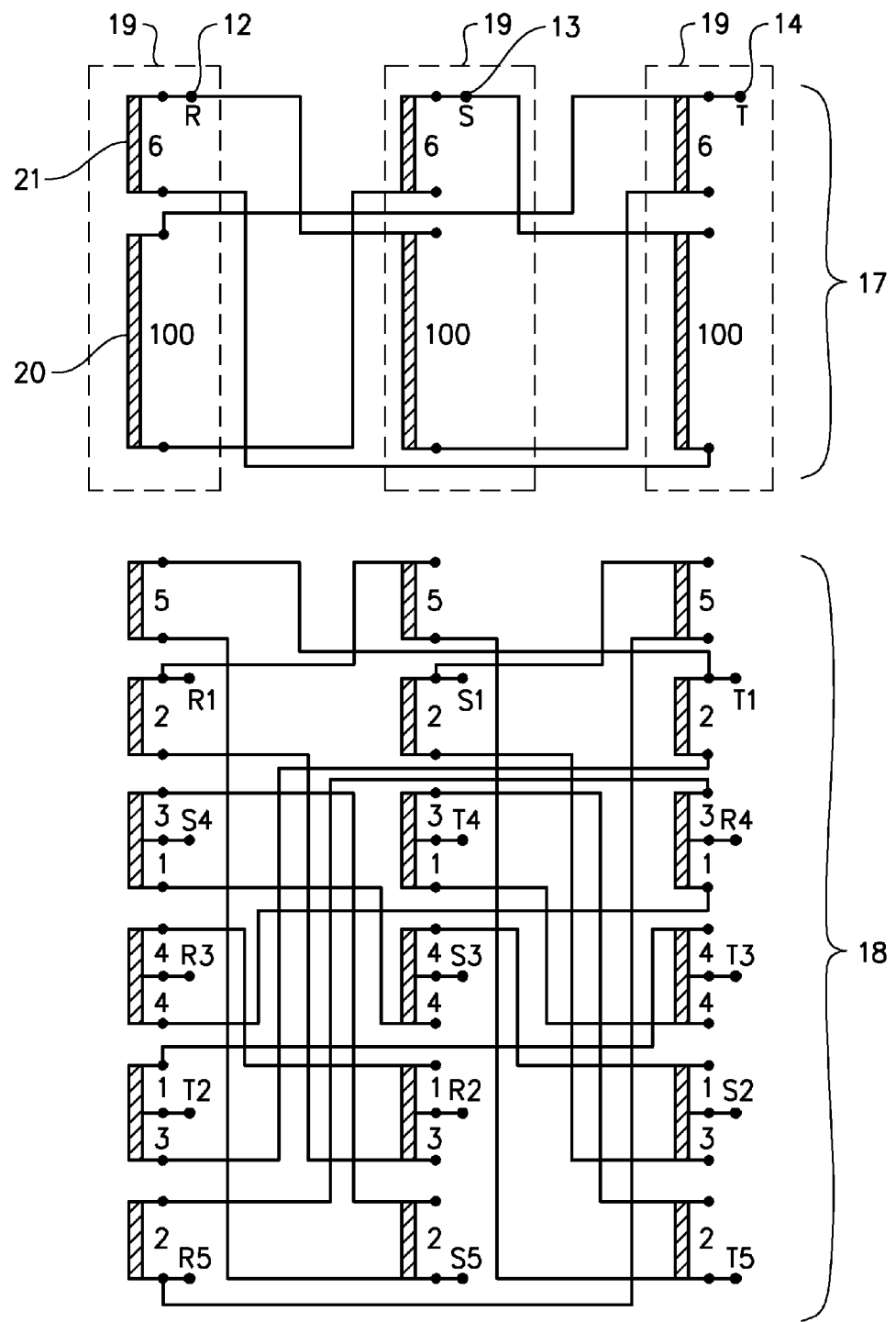
FIG. 6 shows a connection diagram of the primary and secondary winding sets according to the invention.

In FIG. 6, each row of windings in the connection diagram corresponds to the individual windings of each separate leg 6, 7, 8 of the three-legged magnetic core 5. The upper part corresponds to the primary winding set 17, and the lower part corresponds to the secondary winding set 18. Each phase set 19 of the primary winding set 17 comprises a main winding 20 consisting of 100 turns (n=100) and an auxiliary winding 21 consisting of 6 turns (n=6), wherein the phases R, S, T of the power distribution system are connected such that current flowing from one phase to another phase of said phases R, S, T, flows through one main winding 20 and one auxiliary winding 21. The phase shift angle in the primary winding set 17 is determined by the ratio of the main winding 20 to the auxiliary winding 21, which in the present configuration results in a 3° phase shift in the primary winding set 17. The main winding 20 can be wound as a single winding, or alternatively as multiple electrically connected windings on the same core leg accumulating to the desired number of turns. FIG. 5, which shows the phase shift and winding of the primary winding set 17, corresponds to the upper part of FIG. 6.

The lower part of FIG. 6 shows the connection diagram of the secondary winding set 18 comprising 15 output phases R1-R5, S1-S5, T1-T5 corresponding the five phase-shifted three-phase systems. FIG. 4, which corresponds to lower part of FIG. 6, shows said 15 output phases distributed substantially equally over the 360° circle, such that an internal phase shift α of substantially 360/15=24° between neighbouring phases is achieved. The crossings where the dotted lines meet the illustrated circle indicate the optimal position of the output phases for equal distribution. The factual position of these output phases is however dependent on an integer number of turns on appropriate core legs 6, 7, 8, such that the factual position in certain situations is arranged slightly offset from the optimal position, which can be seen for example at point R1 in FIG. 4. Each direction A, B, C of the cornered line connecting said output phases in the phase diagram indicates windings on a specific leg 6, 7, 8 of the magnetic core 5. The complete connection diagram of the primary and secondary winding set 17, 18 is disclosed in FIG. 6, in which the number next to each winding represents the number of turns of said winding. The individual windings of the primary and secondary winding sets 17, 18 are separated with isolation foil to provide galvanic isolation between primary and secondary winding sets 17, 18.

The 15 output phases will after full-wave rectification give rise to 30 current pulses 12° apart, because two pulses are provided by each output phase per period. Moreover, in combination with a first and second identical multiphase transformer rectifier unit 15, 16, each having a 3° phase of the primary winding set, and the change of order in which the input phases R, S, T are connected to said first and second multiphase transformer rectifier units 15, 16, one multiphase transformer rectifier unit 15, 16 will have a positive 3° phase shift, whereas the other multiphase transformer rectifier unit 15, 16 will have a negative 3° phase shift, such that the pulses of the first and second multiphase transformer rectifier units 15, 16 will be 6° out of phase. This configuration leads to interleaving of the 30 output pulses of the first multiphase transformer rectifier unit 15 with the 30 output pulses of the second multiphase transformer rectifier unit 16, such that the current distortion corresponding to a single multiphase transformer rectifier unit 1 having 60 output pulses will be provided.

In FIG. 5, said relation between the number of turns of the main and auxiliary winding and the resulting phase shift is schematically illustrated, as well as the 30 output pulses R1-R10, S1-S10, T1-T10 of each multiphase transformer rectifier unit 15, 16. The essentially triangular vector-winding diagram in FIG. 5, which is composed of the three main—and three auxiliary windings 20, 21, will have a right-rotation or a left-rotation dependent in the order of connection of the input phases R, S, T to the first, second and third input terminals 12, 13, 14. Hence, said vector-winding diagram will have a left-rotation in one of the first and second multiphase transformer rectifier units 15, 16 and right-rotation in the other of said first and second multiphase transformer rectifier units 15, 16.

It is evident that the inventive multiphase transformer rectifier unit 1 can be used either in combination with another multiphase transformer rectifier unit 1 as described above to obtain reduced current distortion on the power distribution system 2 and an increased power factor, or as a single multiphase transformer rectifier unit 1.

One of the benefits of the implementations described above is that two identical multiphase transformer rectifier units 1 are used, and merely the connection of said multiphase transformer rectifier units 1 to the power distribution system changes. This results in increased flexibility in terms of use and installation, as well as reduced manufacturing costs due to simplified production and logistics.

Figure 7:
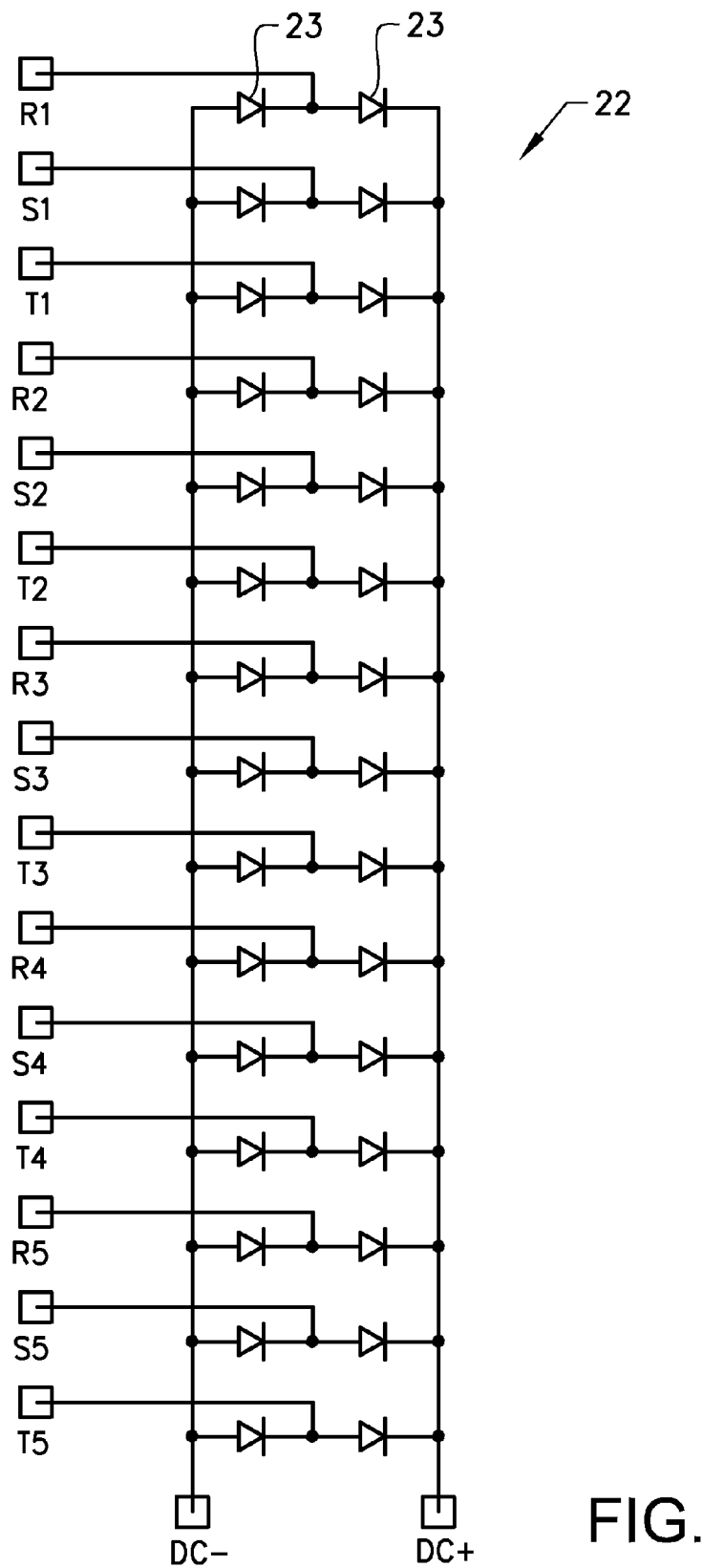
FIG. 7 shows a rectifier circuit according to the invention.

FIG. 7 shows a preferred embodiment of a rectifier circuit of each multiphase transformer rectifier unit 1, formed as a polyphase full-wave bridge rectifier circuit 22. A full-wave rectifier unit comprising two diodes 23 for each output phase converts the whole of the input waveform to one of constant polarity at its output. Each generated three-phase system of the secondary winding set 18 requires a three-phase full-wave bridge rectifier circuit, such that the complete multiphase transformer rectifier unit 1 according to the disclosed embodiment, which is composed of five such three-phase system adding up to 15 output phases, requires five three-phase full-wave bridge rectifier circuits connected in parallel. The outputs of these circuits are joined to form a polyphase rectifier circuit 22 suitable for the multiphase transformer rectifier unit 1 according to the invention. The design of the rectifier circuit 22 is however not limited to the embodiment shown in FIG. 7 and other designs of the rectifier circuit 22 are possible.

The three-phase R, S, T AC power distribution system 2 can be of almost any voltage and frequency, but the multiphase transformer rectifier unit 1 is particularly suitable for use in an aircraft, in which the power distribution system typically comprises three-phase 115 volt AC at 400 Hz supplied from an aircraft generator 24. AC/DC conversion of variable frequency AC is also possible without further adaption. The inventive multiphase transformer rectifier unit 1 may however advantageously be used also in land-, or sea-based vehicles, as well as in fixed constructions.

The inventive multiphase transformer rectifier unit 1 is particularly suitable for supplying DC-power to all types of high power DC-loads 3, in particular high power DC-loads 3 arranged in aircrafts. One example of such a high power DC-loads 3 is a radar system. The multiphase transformer rectifier unit 1 steps down or up the supplied voltage level according to specific demands of the load 3 or loads. Multiple loads of equal of varying power size can be connected to the transformer in series, parallel or a combination thereof. The loads can take various forms, such as pure resistive loads, or combination of resistive, inductive and capacitive loads. The current distortion inflicted on the power supply system 2 by two multiphase transformer rectifier units 1 connected with different primary phase shifts will be further reduced if the loads 4 of each multiphase transformer rectifier unit 1 are of the same magnitude.

An output filter may be arranged between the multiphase transformer rectifier unit 1 and load 3 to provide improved voltage level and ripple smoothening, and in input filter may be arranged between the multiphase transformer rectifier unit 1 and power distribution system 2 to suppress common mode voltages and to protect generator and other electronic equipment connected to the power distribution system 2 from high frequency harmonics.

The term "N is an odd number multiple of 3, and N>3" provides three constraints on the number N:
1) N must be an odd number
2) N must be a multiple of 3. This is herein defined as any number resulting from multiplying 3 with a positive integer, such as 3×1, 3×2, 3×3 etc.
3) N must be larger than 3.

Examples of N fulfilling all these constraints are 9, 15, 21, 27, 33, 39, 45, etc.

As will be realised, the invention is capable of modification in various obvious respects, all without departing from the scope of the appended claims. Accordingly, the drawings and the description thereto are to be regarded as illustrative in nature, and not restrictive.

REFERENCE CORRESPONDENCE TABLE

1 Multiphase transformer rectifier unit
2 Power distribution system
3 Load
4 Power converter
5 Magnetic core
6 First leg
7 Second leg
8 Third leg
9 First coil
10 Second coil
11 Third coil
12 First input terminal
13 Second input terminal
14 Third input terminal
15 First multiphase transformer rectifier unit
16 Second multiphase transformer rectifier unit
17 Primary winding set
18 Secondary winding set
19 Phase set of primary winding set
20 Main winding
21 Auxiliary winding
22 Rectifier circuit
23 Diode
24 Generator
25 Output terminals

The invention claimed is:

1. A power distribution arrangement, comprising:
a first multiphase transformer rectifier unit and a second multiphase transformer rectifier unit, each comprising a magnetic core having a primary winding set and secondary winding set, and a rectifier circuit, wherein said secondary winding set is arranged to generate N substantially equally distributed output phases, wherein N is an odd number multiple of 3, and N>3; and wherein said primary winding set is arranged to provide said output phases with a positive or negative phase shift equal substantially to $$\frac{360}{(8 \times N)}$$

degrees wherein said first and second multiphase transformer rectifier units are connected to a three-phase alternating current power distribution system with a first input terminal, a second input terminal, and a third input terminal, said first input terminal of said first and second multiphase transformer rectifier unit is connected to a first phase of the power distribution system, said second input terminal of said first multiphase transformer rectifier unit is connected to a second phase of the power distribution system, said third input terminal of said first multiphase transformer rectifier unit is connected to a third phase of the power distribution system, said second input terminal of said second multiphase transformer rectifier unit is connected to said third phase, and said third input terminal of said second multiphase transformer rectifier unit is connected to said second phase, such that a first plurality of output phases of the first multiphase transformer rectifier unit are phase shifted with respect to a second plurality of output phases of the second multiphase transformer rectifier unit in order to reduce current distortion in said power distribution system inflicted by said rectifier circuit and/or load.

2. The arrangement according to claim 1, wherein said first and second multiphase transformer rectifier units are connected to individual loads of substantially the same magnitude.

3. The arrangement according to claim 1, wherein said first and second multiphase transformer rectifier units have identical design.

4. A method for reducing current distortion in a power distribution system utilizing an arrangement of a first and a second multiphase transformer rectifier unit connected to a three-phase alternating current power distribution system and at least one DC-load, wherein each of said multiphase transformer rectifier units comprises a rectifier circuit for polyphase AC/DC conversion, and a magnetic core having a primary winding set and secondary winding set, and wherein each primary winding set is connected to said phases of said power distribution system utilizing a first input terminal, a second input terminal and a third input terminal, the method comprising:

generating N substantially equally distributed output phases utilizing said secondary winding set, wherein N is an odd number multiple of 3, and N>3;

providing a positive or negative phase shift of said output phases equal substantially to $$\frac{360}{(8 \times N)}$$

degrees utilizing said primary winding set;

connecting said first input terminal of said first and second multiphase transformer rectifier unit to a first phase of the power distribution system;

connecting said second input terminal of said first multiphase transformer rectifier unit to a second phase of the power distribution system;

connecting said third input terminal of said first multiphase transformer rectifier unit to a third phase of the power distribution system;

connecting said second input terminal of said second multiphase transformer rectifier unit to said third phase; and connecting said third input terminal of said second multiphase transformer rectifier unit to said second phase, such that a first plurality of output phases of the first multiphase transformer rectifier unit are phase shifted with respect to a second plurality of output phases of the second multiphase transformer rectifier unit.

5. The method according to claim 4, further comprising:

disposing said primary winding set in inductive relation with said magnetic core for establishing a magnetic flux therein, and providing each phase set of the primary winding set with a main winding and an auxiliary winding, wherein said resulting phase shift is determined by the ratio of the main winding to the auxiliary winding.

6. The method according to claim 4, further comprising:
arranging the primary winding set in an extended-delta configuration, a zig-zag configuration, or a polygon configuration.

7. The method according to claim 4, further comprising:
designing said rectifier circuit for AC/DC conversion as a polyphase full-wave bridge rectifier.

8. The method according to claim 4, further comprising:
supplying DC to a high-power load utilizing the multiphase transformer rectifier unit.

9. The method according to claim 8, wherein the high-power load is arranged on an aircraft.

* * * * *